T. ROBINSON.
APPARATUS FOR DISTILLING BITUMINOUS SHALES.
APPLICATION FILED SEPT. 11, 1918.

1,317,318.  Patented Sept. 30, 1919.
3 SHEETS—SHEET 1.

WITNESSES:  INVENTOR.
Thos. Robinson
BY Emil Starek
ATTORNEY.

T. ROBINSON.
APPARATUS FOR DISTILLING BITUMINOUS SHALES.
APPLICATION FILED SEPT. 11, 1918.

1,317,318.

Patented Sept. 30, 1919.
3 SHEETS—SHEET 2.

WITNESSES:
Harry A. Bennet
Josamechief

INVENTOR.
Thos. Robinson
By Emil Starek
ATTORNEY.

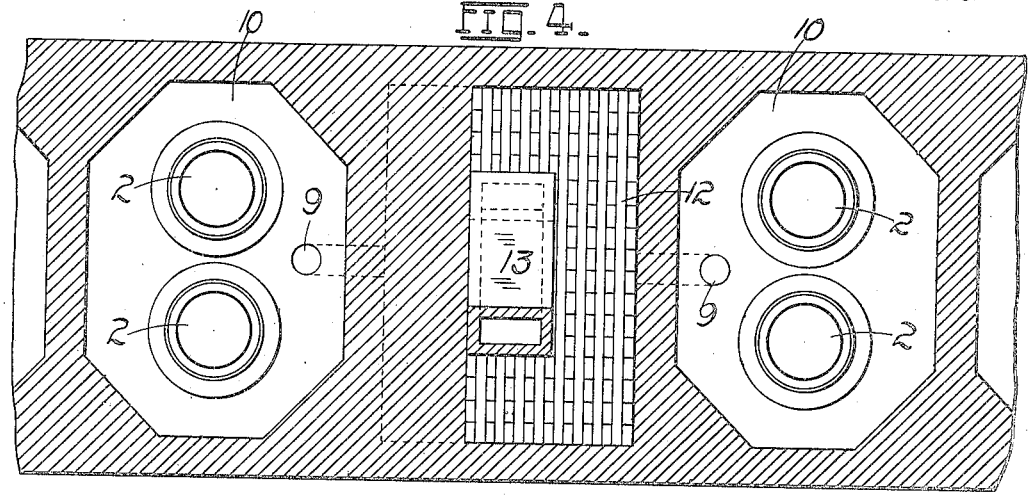
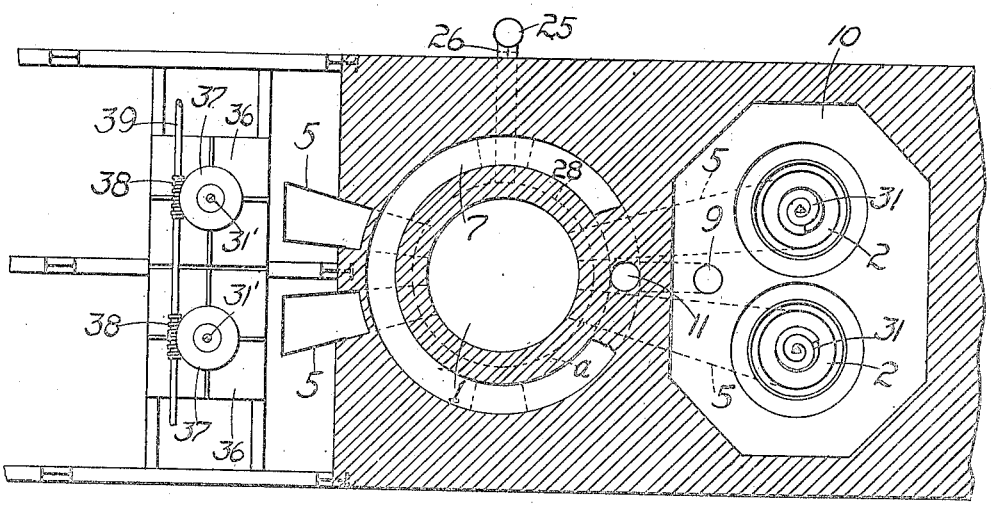
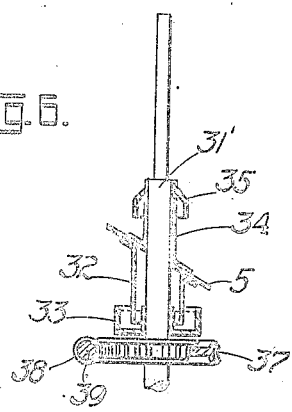

UNITED STATES PATENT OFFICE.

THOMAS ROBINSON, OF ANACONDA, MONTANA.

APPARATUS FOR DISTILLING BITUMINOUS SHALES.

1.317,318.   Specification of Letters Patent.   Patented Sept. 30, 1919.

Application filed September 11, 1918.   Serial No. 253,605.

*To all whom it may concern:*

Be it known that I, THOMAS ROBINSON, a subject of Great Britain, residing at Anaconda, in the county of Deerlodge and State of Montana, have invented certain new and useful Improvements in Apparatus for Distilling Bituminous Shales, of which the following is a full, clear, and exact description, reference being had to the accompanying drawings, forming a part hereof.

The present invention is directed to improvements in apparatus for distilling bituminous shales, the object sought being not only to recover therefrom the oil, burner gases, ammonium sulfate and other available and kindred products but to utilize the burner gases (distilled over in the later stages of the process) in the recuperator or regenerator which is employed in the preheating of the air and in the superheating of the steam by which said gases and the ammoniacal products are distilled from the charge in the generator or treatment chamber into which the retort or retorts discharge, the burner gases being preferably stored in a suitable gasometer to be used when and as, needed. A further object of the invention is to dispose the several parts of the apparatus in such a manner that the distilling operation shall be practically continuous and be carried on without interruption. The invention presents further and other advantages better apparent from the following detailed description in connection with the accompanying drawings in which—

Figure 1:
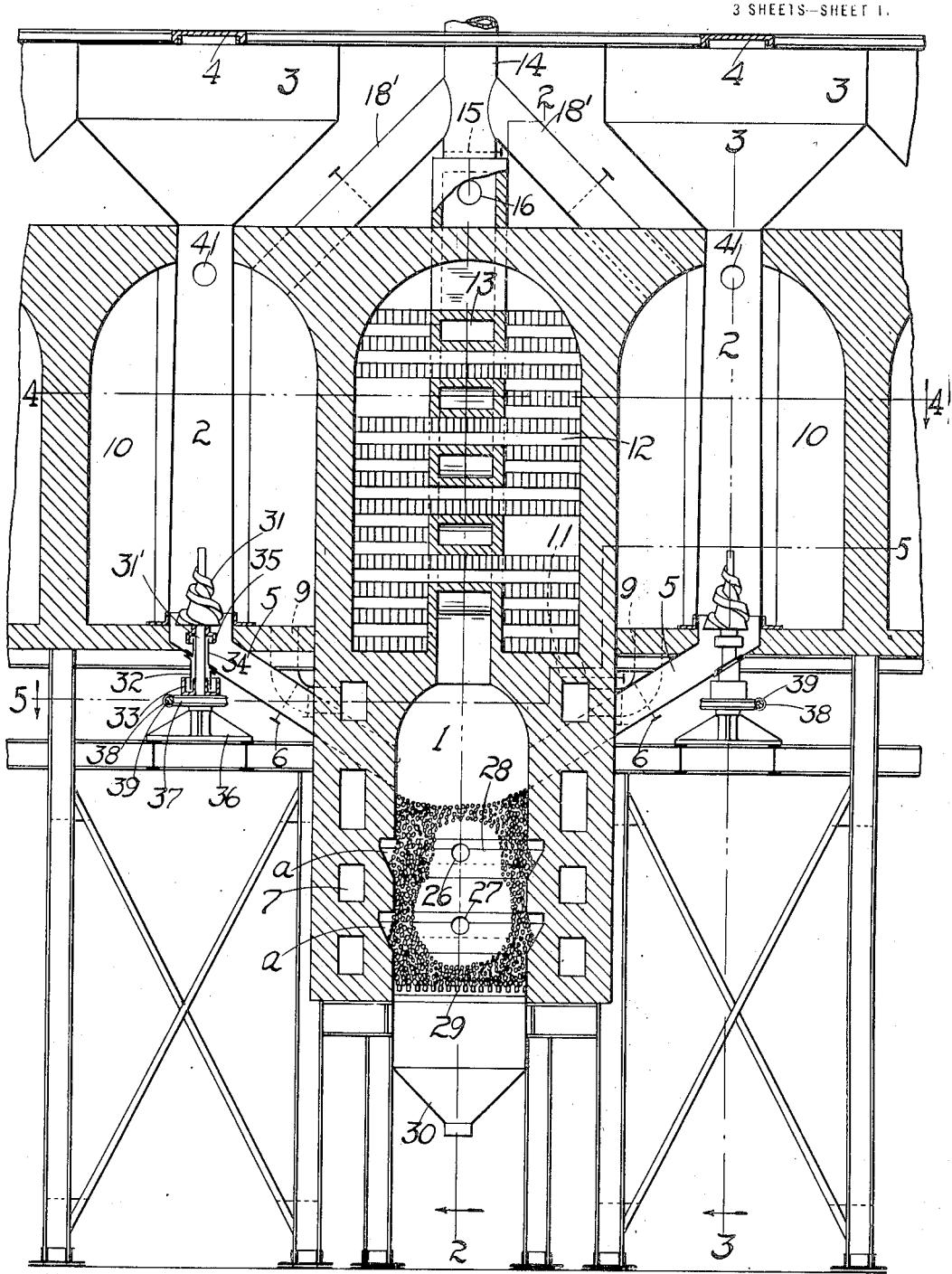
Figure 2:
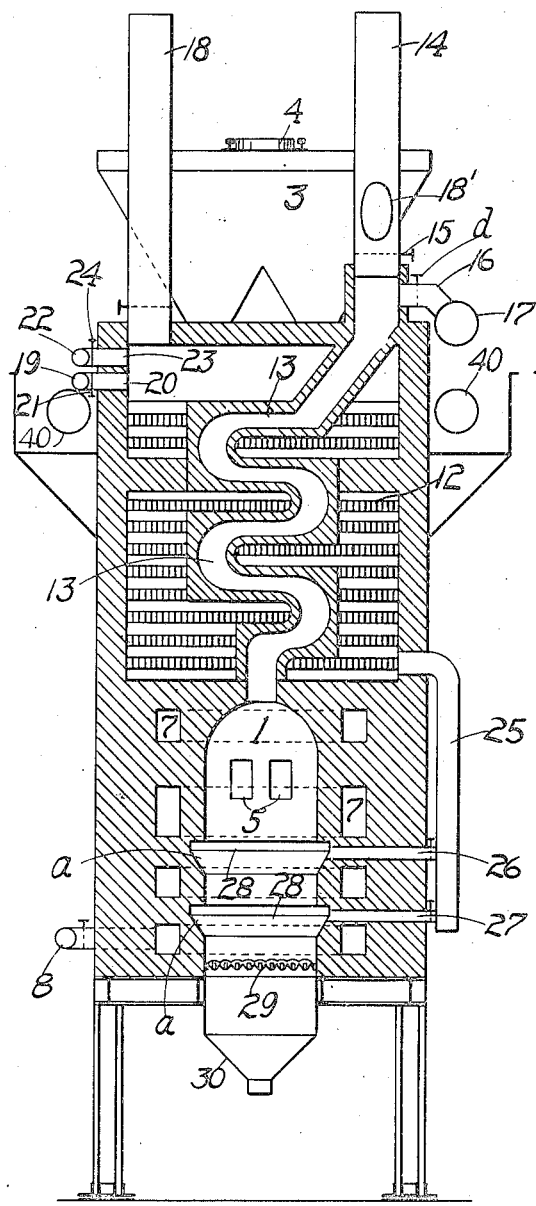
Figure 3:
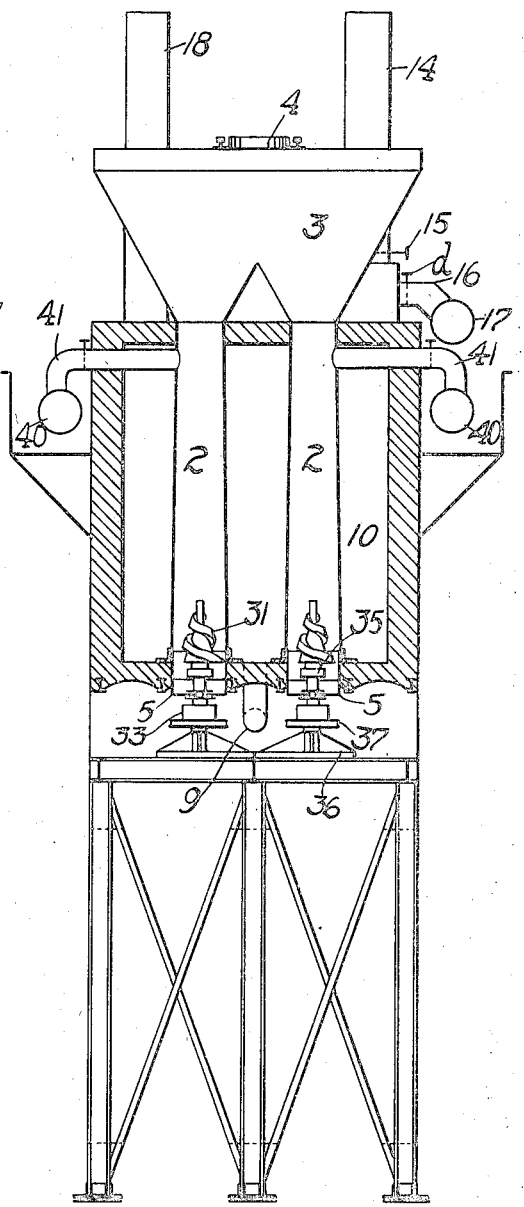

Figure 1 represents a middle vertical longitudinal section through the generator and recuperator and the battery of retorts discharging thereinto; Fig. 2 is a middle vertical transverse section through the generator and recuperator on the line 2—2 of Fig. 1; Fig. 3 is a middle vertical transverse section through a pair of retorts on the line 3—3 of Fig. 1; Fig. 4 is a horizontal section on the line 4—4 of Fig. 1; Fig. 5 is a horizontal section on the zig-zag line 5—5 of Fig. 1; and Fig. 6 to a middle vertical sectional detail of the water seal operating in connection with the shaft of the screw agitator.

Referring to the drawings, 1 represents a suitable treatment chamber or generator into which the material is discharged from one or more retorts 2, there being a battery of four retorts for each generator in the present installation. The retort is a vertical tubular member surmounted by a hopper 3 which is adapted to be closed by a cover 4 as shown. Leading from the lower end of each retort is a chute or conduit 5 pitched to deliver the material from the retort into the generator 1, the conduit tapping the walls of the generator slightly below the crown of the generator chamber as shown, each conduit being provided with a valve or hand-controlled damper 6 of any approved type. Traversing the walls of the generator 1 is a spiral flue 7 to which hot gases and combustion products derived from the burning of the gases distilled from the charge in the generator (as presently to be seen) are conducted through a conduit 8 leading from a furnace or burner to which said burner gases are supplied from a gasometer (not shown), the flue 7 discharging through a flue 9 into the heating chamber 10 surrounding the retort, the said flue tapping the floor of the chamber as shown. Likewise leading from the flue 7 is a damper-controlled flue 11 which is adapted to discharge into the bottom of the regenerator or recuperator 12 which in the present embodiment of my invention is traversed by the sinuous vertical conduit or duct 13 leading from the crown of the generator chamber and discharging into the stack 14. The bottom of the stack 14 is provided with a damper 15 below which the stack is tapped by a damper-controlled pipe 16 leading from the main or pipe 17. Surmounting and communicating with the recuperator chamber at a point opposite the stack 14 is a stack 18. Leading from the chamber 10 and tapping the stack 14 above the damper 15 are flues 18'.

Disposed adjacent the recuperator at the upper end thereof is an air pipe 19 from which leads a pipe 20 connecting the same with the recuperator chamber, said connecting being pipe provided with a valve or damper 21. Contiguous to the pipe 19 in a steam pipe 22 which is connected by a pipe 23 with the recuperator chamber, said connecting pipe being likewise provided with a damper or valve 24. Leading from the bottom of the recuperator at a point diagonally opposite the points at which the pipes 20 and 23 tap the recuperator chamber is a conducting pipe 25 (closed at the bottom) from which lead the damper-controlled pipes 26, 27, said pipes tapping the walls of the generator opposite the annular recesses or "rings" 28 formed on the inner faces of said walls as shown. The sides of the recesses slope downward thereby forming supporting surfaces for the charge gravitating from the retorts into the generator, the angle of repose of the descending charge engaging said surfaces leaving or forming annular flues or ducts *a* between the ore body or charge treated and the upper corners of the recesses, the pipes 26 and 27 discharging directly into said ducts, and permitting the hot air or steam traversing said ducts to permeate and pass through the charge in the generator. The spent ore or shale is removed from the generator by a shaking grate 29 which discharges the same into the bottom bin 30 whence it is conveyed to the dump. In order to prevent caking or packing of the material or shale under treatment in the retort, I provide the latter with an agitator in the form of a screw 31, the stem or shaft 31' of the screw passing loosely through a sleeve 32 depending from the floor of the chute 5, the lower end of the sleeve forming a water seal with the annular trough 33 secured to the shaft. The portion of the screw shaft 31' above the floor of the chute 5 is protected by a sleeve 34 which is surmounted by an annular apron or collar 35 secured to the shaft, said apron preventing dirt and grit lodging between the shaft and said sleeve. The lower end of the screw shaft is supported on a bearing or plate 36 above which the shaft has secured thereto a worm wheel 37 engaged by a pinion 38 on a shaft 39 adapted to be driven from any suitable source of power (not shown). The tops of the retorts communicate with a main or mains 40 through the damper-controlled pipes 41 as shown.

The operation may be described with reference to a single retort since a description of one will suffice for all, it being understood however that a battery of four retorts operate as a unit in the present embodiment of the invention: The shale is first crushed or broken into pieces adapted to pass through a one and one-half (1½) inch ring and delivered to the hopper 3. From the hopper the charge descends into the retort 2 where it is heated by the hot gases in the chamber 10 into which they are conducted by the flue 9 after circulating through the spiral flue 7 formed in the walls of the generator 1, the gases after parting with their heat escaping by way of the flues 18' and stack 14. A portion of the heating gases from the flue 7 is diverted through the flue 11 into the recuperator 12 which is thus heated, the gases finally discharging from the recuperator through the stack 18. The hot gases and combustion products traversing the flue 7 are conducted thereto by the conduit 8 forming the dicharge flue of a furnace (not shown) in which are burnt the gases previously distilled in the generator 1 from the hot shale gravitating thereinto from the retort 2, these gases being stored in a suitable gasometer (not shown). The hot gases in the chamber 10 heat the walls of the retort thereby causing an evolution or distillation of volatile products from the shale in the retort, said volatile products passing off through the pipe 41 into the main 40 whence they are led to suitable condensers (not shown) for the recovery of the crude oil, any gases remaining after condensation being saved in the event they possess any commercial or industrial value. The charge of shale in the retort after the volatile portions carrying the oil component are distilled off is caused to be gradually discharged by the agitating action of the screw 31 which is previously set to rotation, the shale being thus discharged into the generator 1 which the battery of retorts eventually fill and from which the spent shale is removed through the action of the shaking grate 29. It may be stated in passing that the temperature to which the retort walls are heated should be just sufficient to drive off the volatile products from which the crude oil may be subsequently recovered by condensation. After the contents of the battery of retorts are deposited in the chamber or generator 1, and the damper of the flue 11 is closed, air (under pressure of course) is admitted into the recuperator from the pipe 19 and allowed to circulate through the recuperator, the heated air finally discharging through the pipe 25 and branches 26 and 27 into the flues or ducts *a* formed around the charge opposite the recesses or rings 28, the hot air permeating and traversing the charge and thoroughly heating the same, the resulting gases being allowed to escape by way of the duct or conduit 13 through the stack 14, the damper 15 of which is left open, the damper *d* of the pipe 16 leading to the main 17 being at the same time closed. When the charge in the generator has reached a sufficient temperature, say between 1300° and 1400° Fahrenheit, the air is shut off, the damper 15 in the stack 14 is closed and the damper *d* of the pipe 16 is opened, and steam is turned on from the pipe 22 into the recuperator. The steam thus admitted into the recuperator makes the same traverse therethrough and through the generator as the air, the resulting gases thus formed in, and distilled from the charge in the generator, passing off through the conduit 13 into the main 17 whence they are conducted to the scrubbers (not shown), the resulting products being in the main burner gases (which are stored in a suitable gasometer and subsequently used for heating the recuperator in the manner already pointed out) and ammoniacal liquors and kindred products with the refining of which the present invention is not directly concerned.

It is clear from the foregoing that the process involves (1) an initial step of destructive distillation resulting in the evolution of volatile constituents from which crude oil is recovered by condensation; (2) a middle or second step of passing heated air through the partially treated charge to bring the latter to the required temperature for the final step; and a third or last step consisting in passing superheated steam through the hot and partially treated charge for distilling therefrom the burner gases and ammoniacal and kindred products with which said gases are charged and from which they may be separated and subsequently refined by any of the methods known to the art. While I have described the gases expelled by the heated air traversing the charge in the generator as being allowed to escape through the stack 14, it is to be understood that these gases may be intercepted and diverted into the main 17 should their composition justify such interception. Features shown in the drawings but not alluded to are well understood in the art and require no description in the present connection. I may of course depart materially from the details shown without going outside the scope of my invention. In regard to the recuperator it may be added that this will require gases only to start the same, as the air, after permeating through the shale in the generator, will heat the recuperator during its passage through the duct 13.

Having described my invention what I claim is:

1. In an apparatus of the character described, a suitable retort traversed by the material, a generator for receiving the material discharged from the retort, means for causing a circulation of a heating medium along the walls of the generator, means for subsequently conducting said medium to the walls of the retort for heating the same and the contents of the retort to effect a disengagement of the condensable oil constituents of the charge, means for temporarily passing heated air through the material in the generator, a steam superheater means for subsequently passing the superheated steam through the heated material in the generator and thereby expelling therefrom the heating gases and ammoniacal constituents of the charge, and a flue or duct leading from the generator and traversing the superheater.

2. In an apparatus of the character described, a suitable retort traversed by a charge of the material to be treated, a generator for receiving the contents of the retort, means for causing a circulation of a heating medium along the walls of the generator, means for subsequently conducting said medium to the walls of the retort to cause a disengagement of the condensable oil constituents of the charge, a recuperator, means for passing air through the recuperator, means for causing a temporary circulation of the heated air through the material in the generator, means for conducting away the resulting gases, means for subsequently causing a current of steam to traverse the recuperator, means for causing the superheated steam to traverse the material in the generator, means for conducting away the resulting heating gases and ammoniacal constituents of the charge, and a flue or duct leading from the generator and traversing the recuperator.

3. In an apparatus of the character described, a suitable generator, a series of retorts traversed by the material to be treated and discharging the partially treated material into the generator, heating chambers surrounding the retorts, a recuperator, an exit flue or duct leading from the generator and traversing the recuperator, stacks leading from the recuperator and said exit flue respectively, flues leading from the heating chambers and discharging into the stack leading from the exit flue from the generator, an air pipe and a steam pipe operating to successively discharge air and steam into the recuperator, means for conducting the heated air and subsequently the superheated steam to the material in the generator, means circulating hot gases and combustion products through the walls of the generator, means for conducting a part of the hot gases aforesaid to the heating chambers surrounding the retorts for externally heating the contents of the retorts, and means for conducting a portion of said gases to the recuperator for heating the same, the parts operating substantially as, and for the purpose set forth.

In testimony whereof I affix my signature in presence of two witnesses.

THOMAS ROBINSON.

Witnesses:
 FREDERICK W. WALKER,
 HOMER FISHER.